(12) United States Patent
Rich, Jr.

(10) Patent No.: US 7,988,754 B1
(45) Date of Patent: Aug. 2, 2011

(54) PROCESS FOR PRODUCING CLEAN LIQUID FUELS FROM COAL WASTE

(76) Inventor: John W. Rich, Jr., Auburn, PA (US)

( * ) Notice: Subject to any disclaimer, the term of this patent is extended or adjusted under 35 U.S.C. 154(b) by 881 days.

(21) Appl. No.: 11/969,336

(22) Filed: Jan. 4, 2008

(51) Int. Cl.
*C10K 3/06* (2006.01)
*C10J 3/16* (2006.01)
*C10J 3/46* (2006.01)

(52) U.S. Cl. ........................................................ 48/202

(58) Field of Classification Search ..... 48/197 R–197 A, 48/127.1
See application file for complete search history.

(56) References Cited

U.S. PATENT DOCUMENTS

| | | | |
|---|---|---|---|
| 3,437,561 A | 4/1969 | Squires | |
| 3,957,458 A | 5/1976 | Squires | |
| 3,971,639 A * | 7/1976 | Matthews | 48/202 |
| 4,436,531 A * | 3/1984 | Estabrook et al. | 48/197 R |
| 5,189,964 A | 3/1993 | Rich, Jr. | |
| 5,324,336 A * | 6/1994 | Child | 44/608 |
| 5,445,659 A * | 8/1995 | Khan et al. | 48/197 R |
| 6,015,104 A | 1/2000 | Rich, Jr. | |
| 6,170,770 B1 | 1/2001 | Rich, Jr. | |
| 6,664,302 B2 | 12/2003 | French et al. | |
| 6,711,903 B1 | 3/2004 | Rich, Jr. | |
| 6,869,979 B1 | 3/2005 | Rich, Jr. | |
| 6,911,058 B2 | 6/2005 | Calderon et al. | |
| 2007/0256361 A1* | 11/2007 | Kindig | 48/197 R |
| 2007/0295590 A1* | 12/2007 | Weinberg et al. | 201/17 |
| 2008/0222955 A1* | 9/2008 | Jancker et al. | 48/67 |
| 2009/0056225 A1* | 3/2009 | Schinski | 48/198.7 |

OTHER PUBLICATIONS

Rich, Jr. et al., "WMPI—Waste Coal to Clean Liquid Fuels", Oct. 12, 2003.

Rich, Jr., "Testimony Before the Committee on Resources, Subcommittee on Energy and Mineral Resources, United States House of Representatives", May 4, 2006.
Swope, "Coal Converts, When it Comes to Lining up New Energy Sources, a Number of States See Plain old Coal as the Cleanup Hitter", Apr. 2006.
Pytak, "From Coal to Jet Fuel?", The Republican & Herald, Jun. 2006.
Matthews, "Alternative-Energy Grab", Ultra Clean Fuels, Jan. 2007.
Portland Cement Association, "Sustainable Manufacturing Fact Sheet—Iron and Steel Byproducts", Jul. 2005.

* cited by examiner

*Primary Examiner* — Alexa D Neckel
*Assistant Examiner* — Imran Akram
(74) *Attorney, Agent, or Firm* — Howson & Howson LLP

(57) ABSTRACT

The present invention is directed to a process for producing ultra clean liquid fuel from abandoned mine waste. A feedstock is prepared from water and coal mine waste having relatively high ash (non-carbonaceous matter) content. Foundry slag is added to the feedstock as a fluxant to adjust the melting behavior of the ash in the feedstock. Preferably, the fluxant is blast furnace slag provided in a particle size of less than about 150 μm and is provided in an amount sufficient to lower the melting point of the ash in the feedstock by at least about 200° F. The feedstock is admitted with a flow of oxygen into a pressurized chamber of an entrained flow gasifier in which the feedstock and oxygen are heated to produce a synthetic gas from a coal component of the feedstock and molten slag from the ash and fluxant components of the feedstock. The molten slag is of a viscosity to freely flow out of the gasifier through an exit port in the bottom of the gasifier. The synthetic gas can be used to produce paraffin from which ultra clean liquid fuel can be produced.

16 Claims, 1 Drawing Sheet

PROCESS FOR PRODUCING CLEAN LIQUID FUELS FROM COAL WASTE

BACKGROUND OF THE INVENTION

The present invention relates to coal gasification, and more particularly, the invention relates to an efficient process for producing ultra clean liquid fuels from coal waste and mine tailings.

Abandoned mine waste is abundant in most coal mining regions. As one example of such a region, coal mining companies in the first half of the 20$^{th}$ century hauled the purest anthracite coal from northeastern Pennsylvania and left behind vast quantities of waste coal consisting of small hunks of anthracite mixed with other rocks. The waste coal remains in vast, messy, acid-leaching piles that blight the landscape and provide a nasty environmental legacy from the past mining operations. It is estimated that between 82 and 140 million cubic yards of coal mining waste material is present in just the forty largest coal mining waste piles in northeastern Pennsylvania's anthracite region.

Accordingly, there is need for an efficient means for converting the aforementioned coal waste into a clean synthetic gas that can be used, for instance, in power plants to generate electricity and in liquid fuel production plants to produce ultra clean liquid fuels and other value-added products. The productive use of such material will result in the cleaning up of millions of tons of waste coal piles and will enable the reclamation of vast areas of abandoned mine land. The ultra clean liquid fuels can be provided as superior transportation fuels that are virtually free of sulfur and that are low in particulates and aromatics. Such fuel production will also reduce the region's dependency on importing foreign oil.

BRIEF SUMMARY OF THE INVENTION

The present invention is directed to a process for producing ultra clean liquid fuel from abandoned mine waste. A feedstock is prepared from water and coal mine waste having relatively high ash (non-carbonaceous matter) content. Foundry slag is added to the feedstock as a fluxant to adjust the melting behavior of the ash in the feedstock. Preferably, the fluxant is blast furnace slag provided in a particle size of less than about 150µm and is provided in an amount sufficient to lower the melting point of the ash in the feedstock by at least about 200° F. The feedstock is admitted with a flow of oxygen into a pressurized chamber of an entrained flow gasifier in which the feedstock and oxygen are heated to produce a synthetic gas from a coal component of the feedstock and molten slag from the ash and fluxant components of the feedstock. The molten slag is of a viscosity to freely flow out of the gasifier through an exit port in the bottom of the gasifier. The synthetic gas is separately discharged from the gasifier through an outlet located near the top of the gasifier. Thereafter, the synthetic gas is provided to a slurry phase vessel having a catalyst to produce paraffin. The paraffin is used to produce an ultra clean liquid fuel.

DETAILED DESCRIPTION OF THE INVENTION

Figure 1:
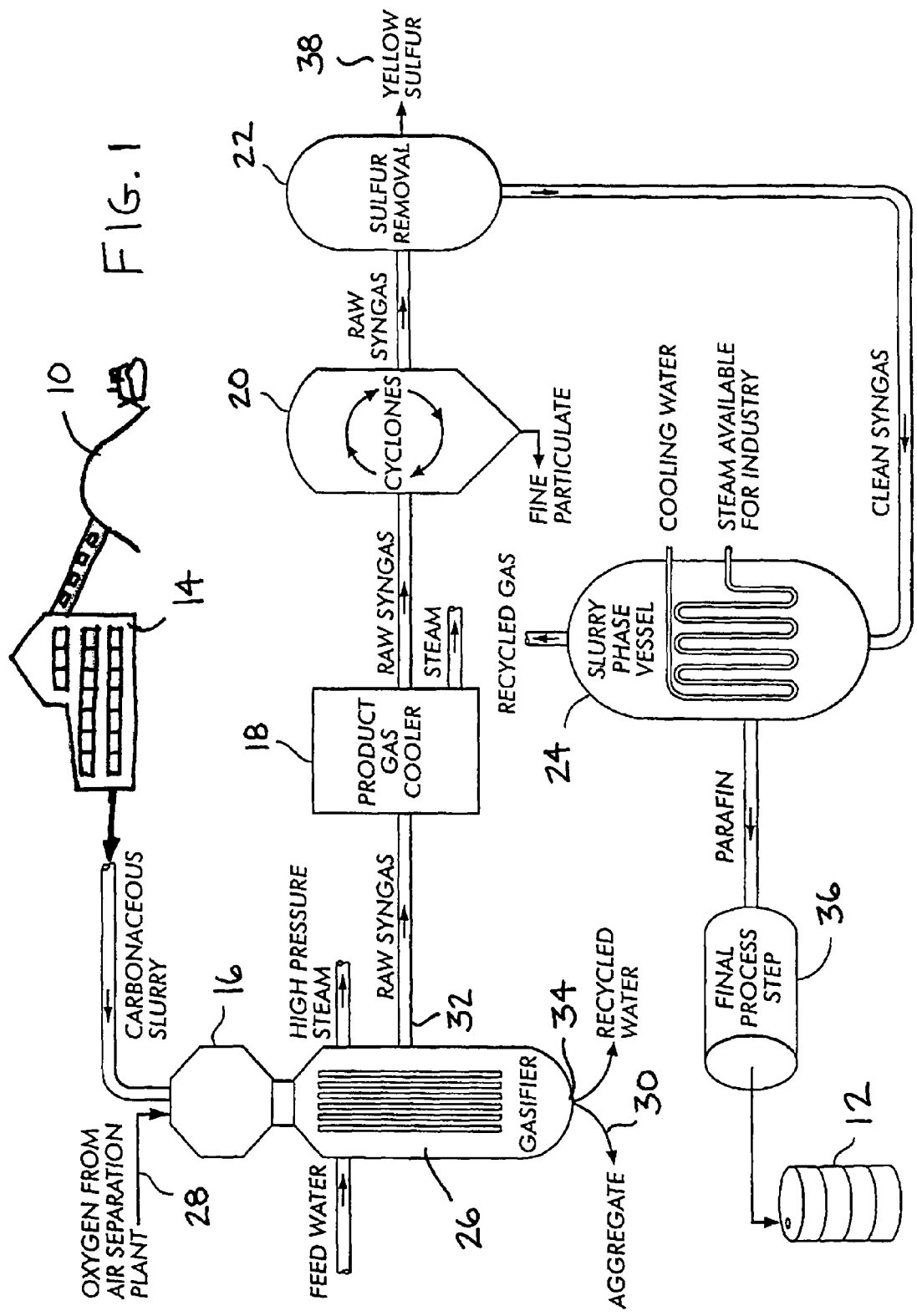
FIG. 1 illustrates schematically a coal gasification and liquefaction plant according to the present invention.

The present invention relates to a coal gasification and liquefaction process utilized to produce ultra-clean liquid fuels. The process preferably utilizes abandoned mine waste 10 to produce a slurry of carbonaceous material that is ultimately transformed into a liquid fuel 12. The process provides a means for eliminating millions of tons of coal mining waste and for reclaiming abandoned mine land. The basic steps of the process include feedstock preparation 14, synthetic gas production and treatment 16, 18, 20 and 22, and Fischer-Tropsch synthesis 24.

Gasifying coal involves mixing a coal waste feedstock with oxygen within a pressurized chamber 26 and heating it therein to above 2,000° F. to produce a synthetic gas, which is basically a blend of hydrogen and carbon monoxide. The synthetic gas can be used in power plants for the production of electricity or it can be converted into a number of different liquid fuels, for instance, via a Fischer-Tropsch chemical process.

Coal waste typically has high ash (non-carbonaceous matter) content. The coal waste is mixed with water to produce a carbonaceous slurry feedstock. The solid particles of the feedstock are reduced to a size required for efficient gasification. For example, the solid particles of the feedstock can be reduced to dust-size particles of less than about 100 µm. The coal waste can be from anthracite or bituminous coal and can be mixed with up to 25% of petroleum coke.

Before the feedstock is fed to a gasifier 16, the slurry is dried so that water content is preferably less than about 2%, and ash content is limited to approximately no greater than about 40%. In addition, a fluxant is added to the feedstock before the feedstock enters the gasifier 16. The fluxant is used to adjust the melting behavior of the ash, as discussed in greater below.

According to the present invention, the feedstock is fed into an entrained flow gasifier 16 in which the coal reacts with oxygen and steam to produce a synthetic gas. Simultaneously, the mineral compounds of the ash and fluxant form a liquid slag 30. The synthetic gas is discharged from the gasifier 16 via an outlet 32 adjacent a top of the gasifier 16 while the molten slag 30 flows through a port 34 located in the bottom of the gasifier 16. This port 34 must remain unclogged to insure the free flow of molten slag 30 out of the bottom of the gasifier 16.

The ash in the coal waste has a high fusion temperature and lumps of non-carbonaceous matter can readily form and prevent the ash from being properly slagged. If this occurs, the port 34 enabling the flow of molten slag 30 out of the bottom of the gasifier may become at least partially clogged. Accordingly, the fluxant is added to the feedstock before it is delivered into the gasifier 16. The purpose of the fluxant is to lower the melting point of the ash and thereby lower the viscosity of the slag 30 and improve its ability to flow out of the gasifier 16.

Foundry slag can be used as the fluxant in the process of the present invention. Foundry slag is a byproduct of the iron and steel industries and is plentiful. For example, blast furnace slag is formed as a byproduct when iron ore or iron pellets, coke and limestone or dolomite are melted together in a blast furnace. When the metallurgical smelting process is complete, the lime chemically combines with the aluminates and silicates of the ore and coke ash to from a non-metallic product called blast furnace slag. As an example, a typical blast furnace slag can consist of: 32-42% of $SiO_2$, 7-16% of $Al_2O_3$, 32-45% of CaO, 5-15% of MgO, 1-2% of S, 1-1.5% of $Fe_2O_3$, and 0.2-1% of MnO.

The non-carbonaceous matter in coal waste is typically high in silica. Thus, the addition of the blast furnace slag to the waste coal is believed to lower the ratio of silica to earthy constituents thereby lowering the viscosity of slag 30 produced in the gasifier 16. Preferably, a sufficient amount of the fluxant is added to the feedstock to lower the melting point of the ash component of the feedstock by about 200° F., for example from about 2,600° to about 2,400° F. The fluxant is preferably milled to a particle size of less than about 150 µm before it is mixed with the feedstock. The small particle size of the fluxant enables it to become uniformly dispersed throughout the feedstock and within the gasifier 16.

The gasifier 16 of the present invention can be a membrane wall reactor installed inside a pressure vessel. Water is circulated within the membrane wall to cool the gasifier. The steam created from the circulating water can be used for various other purposes in the gasification, liquefaction or power plant. The gasifier 16 has a combustion zone 26 into which the feedstock and a supply of oxygen 28 and steam are fed into the gasifier 16. The feedstock and oxygen exothermically react under pressure in the combustion zone 26 to produce raw synthetic gas and molten slag. A single gasifier may process as much as 2,000 tons per day of coal at a temperature in a range of about 2,400° F. to 2,700° F.

Synthetic gas, steam, and the molten slag are separately discharged from the gasifier. The slag 30 is collected in a slag bath where it is quenched and shattered to small glassy granulates. Thereafter, the slag is discharged via a lockhopper system and is separated from the water via a dragchain. The slag can be used in products such as concrete, mortar, plaster and cinder blocks.

Before the synthetic gas enters the liquefaction equipment 24 and 36, the synthetic gas is conditioned to ensure the gas is of a proper purity and quality required by the liquefaction process. For example, the synthetic gas is cooled in a product gas cooler 18 and then subjected to a dry solids removal step 20 in which any fly ash carried with the synthetic gas is removed. The synthetic gas is scrubbed to further lower its dust and fine particulate content as well as its halide content. A sulfur removal step 22 is also utilized. The removed sulfur 38 is of a high quality and can be sold. The resulting clean synthetic gas can be directed into a slurry phase vessel 24 where it is combined with catalysts to yield paraffin, a wax-like substance that is the basic building block from which liquid fuels can be produced. The paraffin can be used to make ultra clean liquid fuels 12 such as naphtha, aviation grade kerosene, sulfur-free diesel fuel, or a high Octane clean reformulated gasoline. These fuels can be used as transportation fuels, home heating fuels, or fuels burned to generate electricity. All are virtually free of sulfur and low in particulates and aromatics.

While a preferred method has been described in detail, various modifications, alterations, and changes may be made without departing from the spirit and scope of the method and apparatus according to the present invention as defined in the appended claims.

The invention claimed is:

1. A process for producing ultra clean liquid fuel, comprising the steps of:
preparing a feedstock including water and coal mine waste having ash content greater than 40%;
adjusting the ash content of the feedstock to about 40%;
adding foundry slag as a fluxant to the feedstock to adjust the melting behavior of the ash in the feedstock;
after said adding step, admitting the feedstock and a flow of oxygen into a pressurized chamber of an entrained flow gasifier in which the feedstock and oxygen are heated to produce a synthetic gas from a coal component within the feedstock and molten slag from the ash and fluxant within the feedstock;
discharging the synthetic gas from the gasifier from an outlet and permitting the molten slag to freely flow through an exit port in the bottom of the gasifier;
processing the synthetic gas in a slurry phase vessel having a catalyst to produce a paraffin; and
producing an ultra clean liquid fuel from the paraffin.

2. A process according to claim 1, wherein the fluxant is blast furnace slag.

3. A process according to claim 1, further comprising the step of reducing the particle size of the fluxant to less than about 150 µm before said admitting step.

4. A process according to claim 3, further comprising the step of reducing the particle size of the coal mine waste to less than about 100 µm before said admitting step.

5. A process according to claim 3, wherein the fluxant lowers the melting point of the ash by at least about 200° F.

6. A process according to claim 3, further comprising the step of adjusting the water content of the feedstock to less than about 2% before said admitting step.

7. A process according to claim 3, wherein the gasifier has a combustion zone that is heated to a temperature of at least above 2,000° F. to produce the synthetic gas and molten slag.

8. A process according to claim 7, wherein the combustion zone is heated to a temperature of 2,400° F. to 2,700° F.

9. A process according to claim 3, wherein the coal mine waste is waste anthracite.

10. A process according to claim 3, further comprising the step of adding petroleum coke to the feedstock.

11. A process according to claim 10, wherein the petroleum coke forms 25% of the feedstock.

12. A process according to claim 3, wherein the gasifier is water cooled.

13. A process according to claim 12, wherein the gasifier is a membrane wall reactor installed inside a pressure vessel and wherein water is circulated within a wall of the membrane wall reactor.

14. A process according to claim 3, further comprising the steps of cooling the synthetic gas, removing particulates from the synthetic gas, and removing sulfur from the synthetic gas.

15. A process according to claim 14, wherein the ultra clean liquid fuel includes at least one of naphtha, kerosene, and diesel.

16. A process according to claim 15, wherein the ultra clean liquid fuel is a transportation fuel selected from aviation jet fuel, military jet fuel, sulfur-free diesel fuel, and high-Octane clean reformulated gasoline.

* * * * *